(12) United States Patent
Morita

(10) Patent No.: US 8,687,088 B2
(45) Date of Patent: Apr. 1, 2014

(54) IMAGE CAPTURING APPARATUS THAT COMMUNICATES WITH ANOTHER IMAGE CAPTURING APPARATUS AND CONTROL METHOD FOR COMMUNICATION

(75) Inventor: Hiroyasu Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 12/652,863

(22) Filed: Jan. 6, 2010

(65) Prior Publication Data
US 2010/0182439 A1    Jul. 22, 2010

(30) Foreign Application Priority Data

Jan. 16, 2009  (JP) ................................ 2009-008239
Dec. 22, 2009  (JP) ................................ 2009-290868

(51) Int. Cl.
*H04N 5/76* (2006.01)

(52) U.S. Cl.
USPC ..................................... 348/231.2; 348/231.3

(58) Field of Classification Search
CPC ............................ H04N 5/23203; H04N 5/232
USPC ......... 348/231.99, 231.2, 231.3, 231.5, 231.6
See application file for complete search history.

(56) References Cited

U.S. PATENT DOCUMENTS

| | | | | |
|---|---|---|---|---|
| 5,477,546 | A * | 12/1995 | Shibata et al. ................. | 370/260 |
| 6,784,925 | B1 * | 8/2004 | Tomat et al. ............. | 348/207.11 |
| 7,158,175 | B2 * | 1/2007 | Belz et al. ................... | 348/231.3 |
| 7,499,084 | B2 | 3/2009 | Kurakata | |
| 7,742,094 | B2 | 6/2010 | Matsuno et al. | |
| 2004/0090525 | A1 * | 5/2004 | Eichmann ...................... | 348/148 |
| 2004/0141084 | A1 * | 7/2004 | Kurakata ................. | 348/333.01 |
| 2004/0179115 | A1 * | 9/2004 | Tomat et al. ................ | 348/231.6 |
| 2004/0183915 | A1 * | 9/2004 | Gotohda et al. .......... | 348/207.11 |
| 2006/0174203 | A1 * | 8/2006 | Jung et al. ...................... | 715/751 |
| 2006/0290788 | A1 * | 12/2006 | Ohtsuka et al. ............. | 348/231.3 |
| 2007/0206831 | A1 | 9/2007 | Matsuno et al. | |
| 2008/0068469 | A1 * | 3/2008 | Takagi et al. ............... | 348/231.2 |
| 2009/0207254 | A1 * | 8/2009 | Tomat et al. ................ | 348/207.1 |

FOREIGN PATENT DOCUMENTS

| | | |
|---|---|---|
| JP | 2003-87615 | 3/2003 |
| JP | 2003-189212 | 7/2003 |
| JP | 2003-209796 | 7/2003 |
| JP | 2003-234987 | 8/2003 |
| JP | 2004-140795 A | 5/2004 |
| JP | 2004-194013 A | 7/2004 |
| JP | 2004-320514 A | 11/2004 |
| JP | 2008-301448 A | 12/2008 |

OTHER PUBLICATIONS

Archive.org retrieval of Jan. 23, 2004 version of http://panasonic.jp/dc/dpof_110/white_e.htm titled "Summary of DPOF Version1.10".*

* cited by examiner

*Primary Examiner* — Nicholas Giles
(74) *Attorney, Agent, or Firm* — Fitzpatrick, Cella, Harper & Scinto

(57) ABSTRACT

An image capturing apparatus which communicates with another image capturing apparatus, comprises an image capturing unit configured to obtain image data by capturing an image of an object; a reception unit configured to receive image data captured by the other image capturing apparatus during communication with the other image capturing apparatus; a storage unit configured to store the image data received by the reception unit in a storage medium; and a processor configured to describe image information of the image data received by the reception unit in an information file which describes image information used to identify image data stored in the storage unit.

10 Claims, 8 Drawing Sheets

```
[HDR]                                                      500
GEN REV = 01.10
GEN CRT = "CAMERA B"
GEN DTM = 2007:11:20:13:00:00

[IMAGE DURING COMMUNICATION]        501
VUQ VNM = Vender Name
IMG FMT = EXIF2-J                502
VUQ CAMERA NAME "CAMERA B"            503
VUQ CAPTURED DATE AND TIME "2007 :11:20 12:00:00"
<IMG SRC = "../DCIM/100CAN0C/IMG_0001.jpg">    504

[IMAGE DURING COMMUNICATION]
VUQ VNM = Vender Name
IMG FMT = EXIF2-J
VUQ CAMERA NAME "CAMERA B"
VUQ CAPTURED DATE AND TIME "2007 :11:20 12:30:00"
<IMG SRC = "../DCIM/100CAN0C/IMG_0002.jpg">

[IMAGE DURING COMMUNICATION]
VUQ VNM = Vender Name
IMG FMT = EXIF2-J
VUQ CAMERA NAME "CAMERA A"
VUQ CAPTURED DATE AND TIME "2007 :11:20 13:00:00"
<IMG SRC = "../DCIM/100CAN0C/IMG_0003.jpg">
```

OOO.MRK

○○○.MRK

F I G. 7

```
[HDR]
GEN REV = 01.10
GEN CRT = "CAMERA B"
GEN DTM = 2007:11:20:13:00:00

[JOB]
PRT PID = 001
PRT TYP = STD
PRT QTY = 002
IMG FMT = EXIF2-J
<IMG SRC = "../DCIM/100CAN0C/IMG_0001.jpg">

[JOB]
PRT PID = 001
PRT TYP = STD
PRT QTY = 002
IMG FMT = EXIF2-J
<IMG SRC = "../DCIM/100CAN0C/IMG_0002.jpg">

[JOB]
PRT PID = 002
PRT TYP = STD
PRT QTY = 006
IMG FMT = EXIF2-J
<IMG SRC = "../DCIM/100CAN0C/IMG_0003.jpg">
```
~700

AUTPRINT.MRK ured to receive image data captured by the other image capturing apparatus during communication with the other image capturing apparatus; a storage unit configured to store the image data received by the reception unit in a storage medium; and a processor configured to describe image information of the image data received by the reception unit in an information file which describes image information used to identify image data stored in the storage unit.

IMAGE CAPTURING APPARATUS THAT COMMUNICATES WITH ANOTHER IMAGE CAPTURING APPARATUS AND CONTROL METHOD FOR COMMUNICATION

BACKGROUND OF THE INVENTION

1. Field of the Invention

The present invention relates to a data communication technique between image capturing apparatuses.

2. Description of the Related Art

In recent years, digital cameras have rapidly prevailed. An image captured by a digital camera is stored in, for example, a CF® card or SD® card, and the stored image can be reproduced. When reproducing images using a digital camera, many apparatuses automatically display images like a slideshow in place of one-by-one manual selections of images by the user.

A digital camera can be directly connected to a printer to print images. In a digital camera that is capable of reproducing images with a slideshow and printing them, the user often manually sets these reproducing and printing modes while confirming images after capture. However, as the number of images grows, a troublesome number of user operations are required.

In order to improve such operability, a camera that has a function allowing the user to set in advance slideshow and printing operations for images to be newly captured, and automatically executes these settings at the time of capturing of an image in that state is available (see Japanese Patent Laid-Open No. 2003-189212).

In addition to the aforementioned function, a current digital camera incorporates a network communication function such as a wireless communication function, so as to allow easy communication with two or more cameras. Also, a system is also available whereby, when the user captures an image using a certain camera while two or more cameras are connected to be able to communicate with each other, the captured image is promptly transmitted to other cameras is also available. For example, in this system, when a user captures an image using camera A, that image is automatically transmitted also to camera B. Conversely, when another user captures an image using camera B, that image is automatically transmitted also to camera A.

As described above, upon performing communications between cameras, images captured by a plurality of cameras in an identical event site can be easily shared in real time.

A camera, which can receive and store images captured by another camera while it captures an image while two or more cameras are connected to be able to communicate with each other, stores images captured by the other camera and those captured by itself. These images are more likely to be obtained by capturing identical event scenes, and are desirably managed collectively.

For example, a user may wish to print images captured by own camera and those received from another camera or to reproduce those images with a slideshow collectively in some cases. However, in the conventional system, images captured by the own camera and those captured by another apparatus have to be individually set as slideshow or print targets, thus requiring troublesome operations.

SUMMARY OF THE INVENTION

The present invention has been made in consideration of the aforementioned problems, and implements a technique which allows easy handling of images received from another image capturing apparatus as well as those captured by the apparatus itself without requiring any troublesome operations.

In order to solve the aforementioned problems, the present invention provides an image capturing apparatus which communicates with another image capturing apparatus, comprising: an image capturing unit configured to obtain image data by capturing an image of an object; a reception unit configured to receive image data captured by the other image capturing apparatus during communication with the other image capturing apparatus; a storage unit configured to store the image data received by the reception unit in a storage medium; and a processor configured to describe image information of the image data received by the reception unit in an information file which describes image information used to identify image data stored in the storage unit.

The present invention also provides a control method of an image capturing apparatus which has an image capturing unit configured to capture an object and obtain image data and communicates with another image capturing apparatus, comprising the steps of: receiving image data captured by the other image capturing apparatus during communication with the other image capturing apparatus; storing the image data received in the receiving in a storage medium; and describing image information of the image data received in the receiving in an information file which describes image information used to identify image data stored in the storage medium.

According to the present invention, image files received from another image capturing apparatus as well as those captured by the apparatus itself can be easily handled without requiring any troublesome operations.

Further features of the present invention will become apparent from the following description of exemplary embodiments (with reference to the attached drawings).

BRIEF DESCRIPTION OF THE DRAWINGS

FIG. 7 is a view showing an example of the configuration of a printing setting file;

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

<First Embodiment>
[Overview of System]

Figure 1:
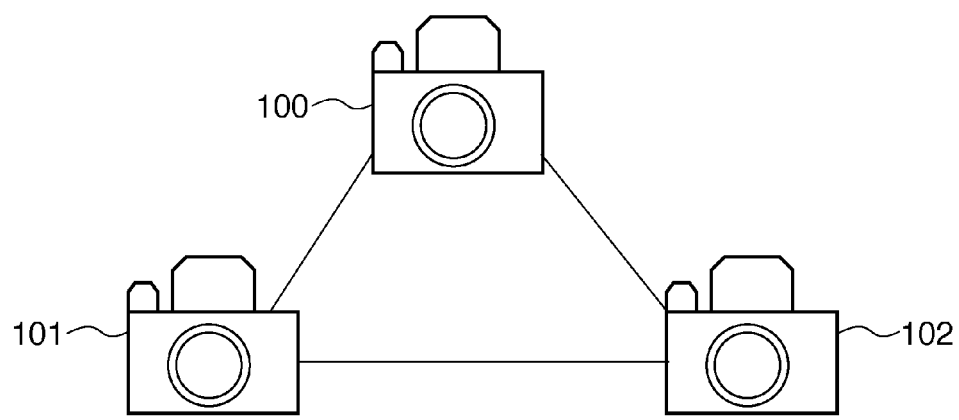
FIG. 1 is a view showing a state in which a plurality of image capturing apparatuses of an embodiment according to the present invention are connected to be able to communicate with each other.

FIG. 1 is a view showing a system in which image capturing apparatuses according to an embodiment of the present invention are connected via a network. Referring to FIG. 1, a plurality of digital cameras (to be simply referred to as "cameras" hereinafter) 100 to 102 as examples of an image capturing apparatuses are connected via a network to be able to communicate with each other. When the user captures an image using a certain digital camera, that camera automatically transmits the captured image to other cameras during communication, and the other cameras store the received image.

Each of the cameras 100 to 102 has a plurality of modes. For example, each of the cameras 100 to 102 of this embodiment has a normal capturing mode for capturing an image of an object by itself, and a reproducing mode for reproducing captured images. Furthermore, each of the cameras 100 to 102 of this embodiment has a communication capturing mode.

The communication capturing mode will be described below. Initially, for example, each of the cameras 100 to 102 enters the communication capturing mode according to the user's menu operation to establish communications with other cameras. Then, when a user captures an image using the camera 100, a captured image file is stored in a storage medium of the camera 100, and is automatically transmitted to the cameras 101 and 102. Furthermore, when another user captures an image using the camera 101, a captured image file is stored in a storage medium of the camera 101, and is automatically transmitted to the cameras 100 and 102.

In this manner, in the communication capturing mode, even when the user does not make any special operation for transmission, he or she need only capture an image of an object to automatically exchange or share an image file among the cameras 100 to 102. In this embodiment, a file is automatically transmitted. However, the user may manually issue a transmission instruction of an image file.

[Arrangement of Camera]

Figure 2:
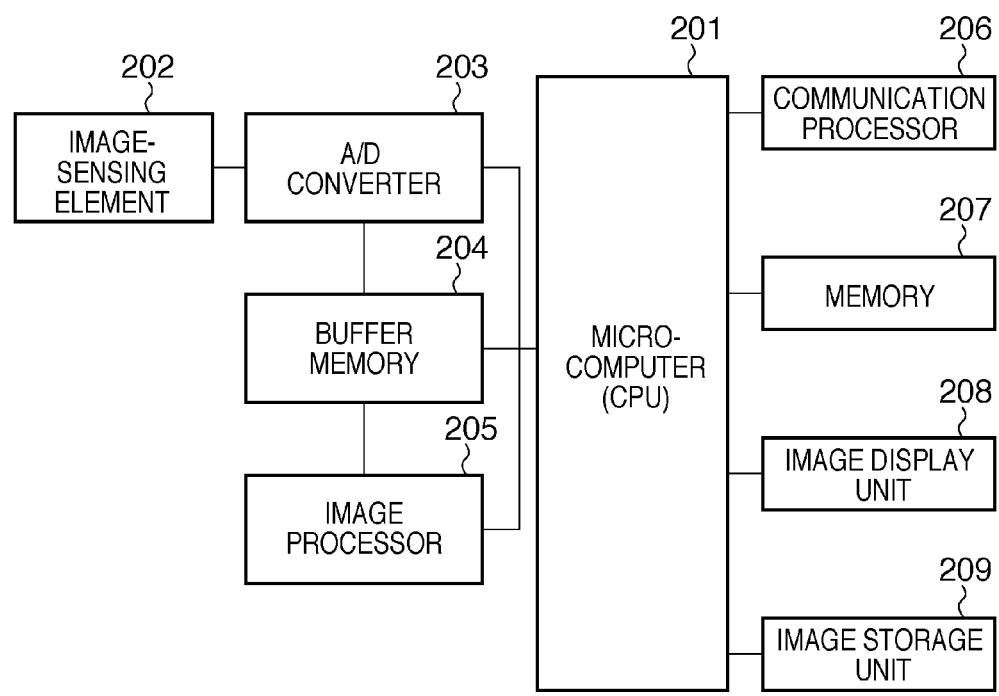
FIG. 2 is a block diagram showing the arrangement of an image capturing apparatus according to the present embodiment.

FIG. 2 is a block diagram showing the arrangement of the camera according to the present embodiment. Referring to FIG. 2, an image-sensing element 202 including, for example, a CCD, photoelectrically converts an optical image of an object to generate an electrical signal. An A/D converter 203 converts an analog electrical signal output from the image-sensing element 202 into a digital signal. A buffer memory 204 temporarily stores a digital image signal from the A/D converter 203. An image processor 205 applies required image processes such as edge compensation, gamma correction, and white balance correction to the digital image data output from the buffer memory 204, thereby generating an image file.

A communication processor 206 executes communication processing between cameras. Since this embodiment assumes a wireless communication, the communication processor 206 executes processing required for a wireless communication such as conversion into a data format for communication, and transmits/receives various data via an antenna included in itself. Note that the communication processor 206 executes required communication processing even in a wired communication.

A nonvolatile memory 207 stores programs and the like for making a microcomputer 201 including a CPU and the like execute various processes. An image storage unit 209 is a storage medium such as a memory card, and stores setting information for an image printing mode, slideshow mode, and the like. The image storage unit 209 stores captured image files and received image files. Note that the image storage unit 209 may be built in the camera or may be detachable from the camera. The camera can have at least an interface required to access a storage medium.

Note that the image storage unit 209 can store not only images compression-encoded by, for example, JPEG, but also so-called RAW images. Upon reproducing RAW images with a slideshow, the image processor 205 executes developing processing for each image to be reproduced, and an image display unit 208 displays the processed images.

The image storage unit 209 also stores an information file which describes image information required to identify image data, in addition to the image data. As will be described later, this information file describes image information such as an apparatus name used to capture image data, and captured date and time, and also file paths where image data are stored in the order of captured dates and times. The information file is referred to upon execution of printing, reproducing, and deleting of image data, as will be described later.

The image display unit 208 executes display processing for displaying previews of images stored in the image storage unit 209. The image display unit 208 also executes processing for displaying a thumbnail list that allows the user to select images to be transmitted upon transmitting images to another storage apparatus or image capturing apparatus via a network.

The microcomputer 201 controls the operations of the camera in whole, including the image-sensing element 202, A/D converter 203, buffer memory 204, image processor 205, communication processor 206, memory 207, image display unit 208, and image storage unit 209. Note that the camera may be controlled by a single hardware component or may be controlled to function as various units while a plurality of hardware components share processes.

In the following description, assume that two cameras A and B make communication for the sake of easy understanding of the description. Note that the present invention can be applied not only to a state in which only two cameras are connected but also to a state in which three or more cameras are connected, as shown in FIG. 1.

[Communication Processing Between Cameras]

In this embodiment, two cameras A and B exchange image files captured by cameras A and B, and pieces of image information associated with the image files with each other, and describe the image information in their information files.

Figure 3:
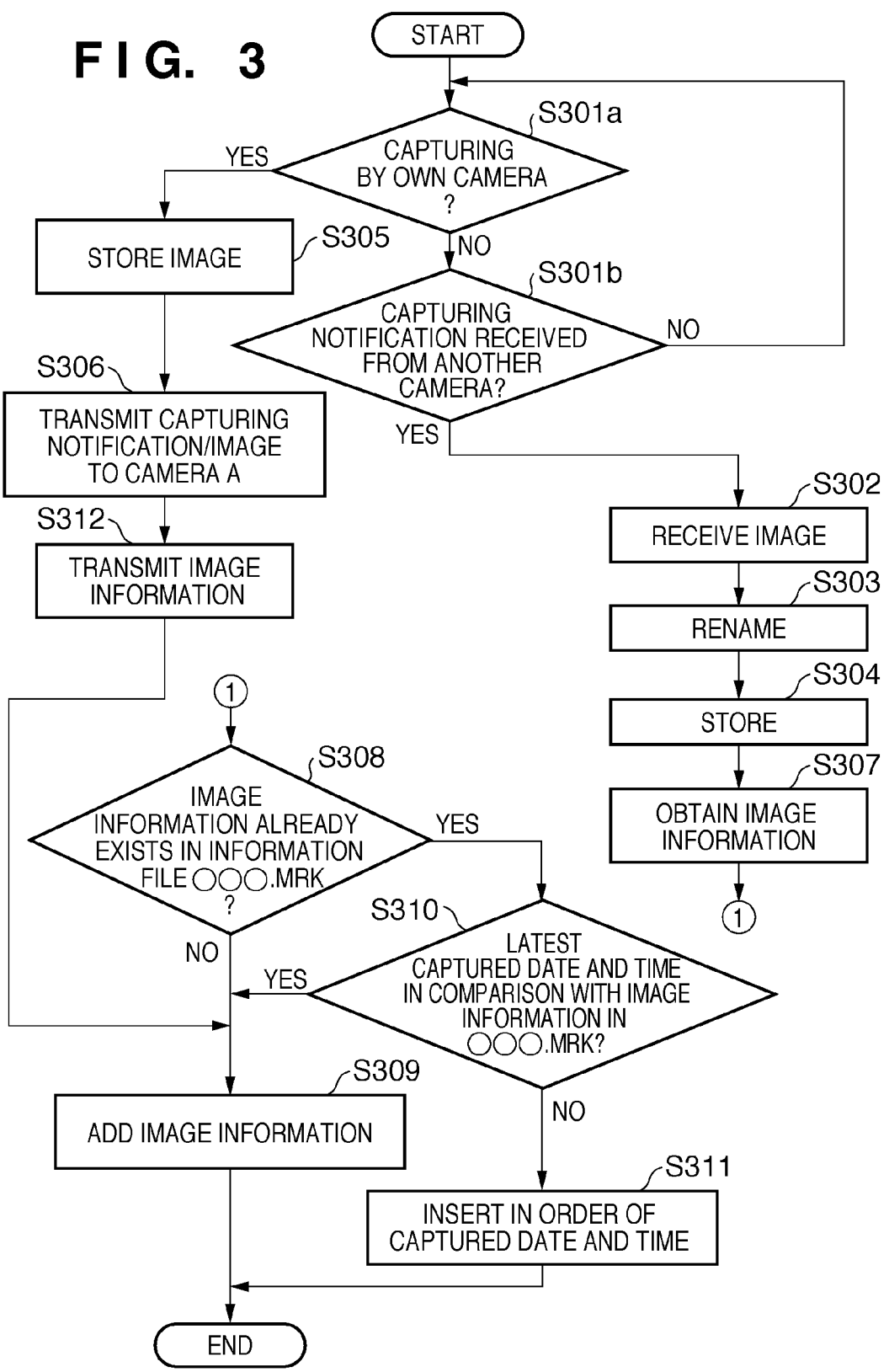
FIG. 3 is a flowchart showing communication processing between cameras according to the present embodiment.

FIG. 3 is a flowchart showing the communication processing between the cameras of this embodiment. In this case, the operation of camera B will be exemplified below. Referring to FIG. 3, the microcomputer 201 of camera B checks if the camera B itself executes capturing (S301a).

A case will be described first wherein it is determined that no capturing is executed. If it is determined that no capturing is executed, the microcomputer 201 of camera B checks if a capturing notification is received from another apparatus (camera A in this case) (S301b). Note that the capturing notification is transmitted, in response to execution of capturing in the communication capturing mode in a certain camera, to another camera to which a communication is established. That is, in this case, when camera B receives the capturing notification, camera A executes capturing, and transmits the capturing notification to camera B. If it is determined that the capturing notification is received, the microcomputer 201 of camera B receives an image file transmitted from camera A to follow the capturing notification (S302).

Upon reception of the image file, the microcomputer 201 of camera B confirms the folder configuration, file names, and the like of image files stored in the image storage unit 209 of camera B as a self-apparatus, and executes rename processing of the image file received from camera A (S303). The rename processing will be described later. After the rename processing, the microcomputer 201 of camera B stores the received image file in the image storage unit 209 (S304).

Figure 4:
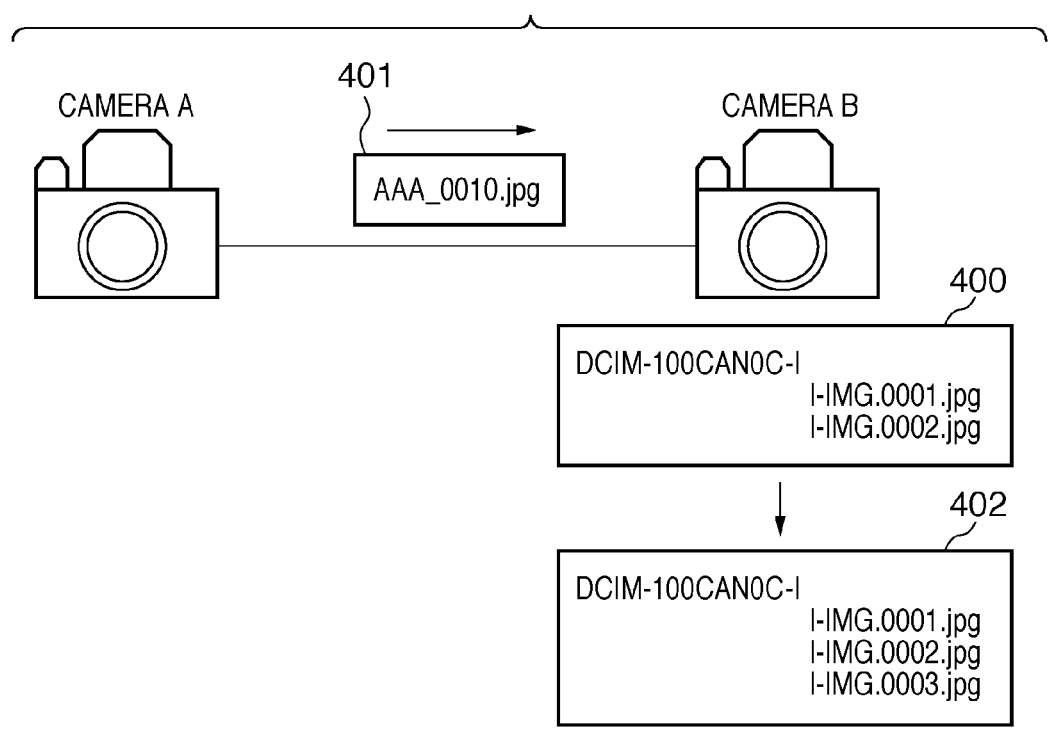
FIG. 4 is a view for explaining processing for renaming a file name of a received image file.

FIG. 4 is a view for explaining the rename processing in step S303 of FIG. 3. For example, assume that camera B assigns a file name by combining a character string "IMG" and a serial number. Also, assume that the image storage unit 209 of camera B stores two images, that is, $IMG_{13}$ 0001.jpg and IMG_0002.jpg in a 100CANOC folder under a DCIM folder at the beginning of the processing in FIG. 3 (an area 400). Furthermore, assume that camera A as another apparatus assigns a file name by combining a character string "AAA" and a serial number, and a file name of an image 401 received from camera A is AAA_0010.jpg. Note that the DCIM folder is a folder name of a root layer, which is compliant with the DCF standard as an image format for a digital camera.

For example, when an image file received from camera A is stored intact in the image storage unit 209 of camera B without changing its file name, file management becomes troublesome. For example, when image files are sorted based on their file names, since "IMG_0001.jpg" and "AAA_0010.jpg" are displayed at distant locations, it is troublesome for the user to find these files. For this reason, camera B confirms the current folder configuration and the file name upon storing the received image file, and renames the file name so as to be added to the bottom of the current files. In the example of FIG. 4, the image file AAA_0010.jpg received from camera A is stored as IMG_0003.jpg in the 100CANOC folder under the DCIM folder (an area 402).

After that, the microcomputer 201 of camera B obtains image information of the received image file from camera A (S307). This image information includes the captured date and time, camera name, image size, and the like. Since these pieces of information are often included in the image file as attribute information, required pieces of information can also be selectively obtained.

Processing for writing the image information in the information file will be described below. In this case, when an image file that describes the image information does not exist, the obtained image information is described intact in the information file.

Figure 5:
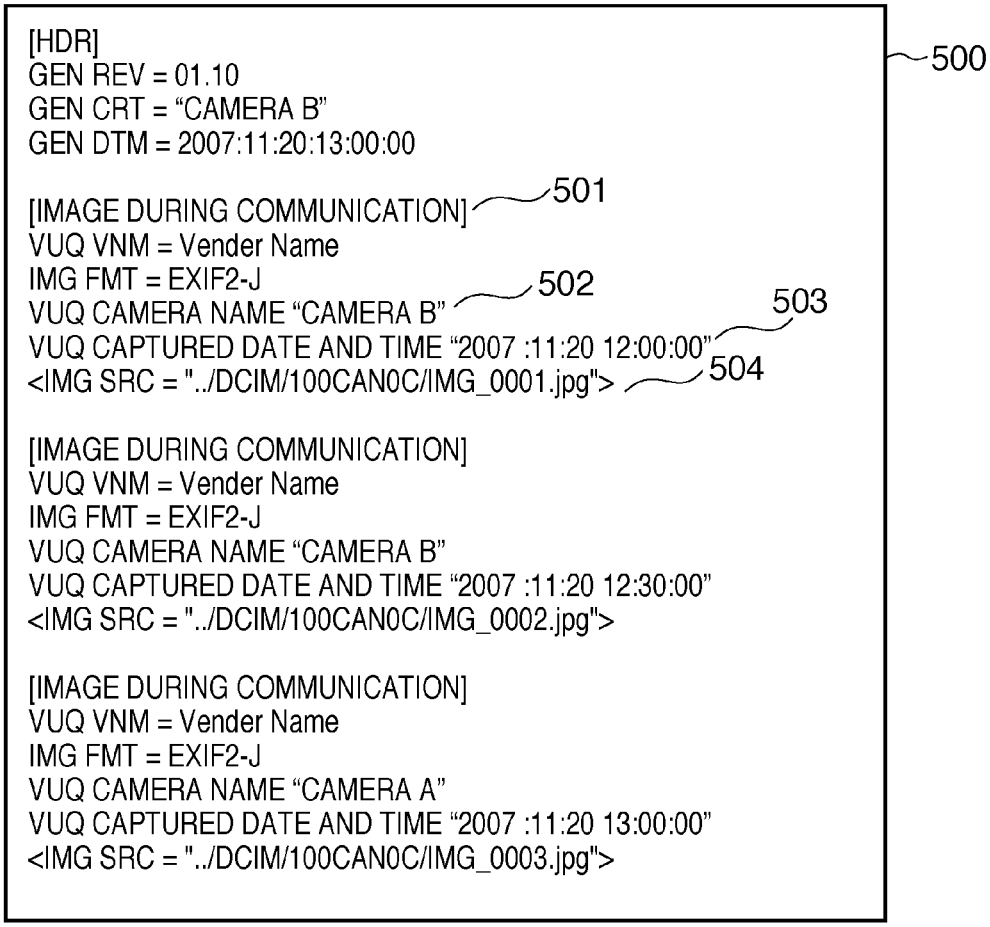
FIG. 5 is a view showing an example of an information file.

FIG. 5 exemplifies the configuration of the information file, and image information described in an information file 500 of this example is compliant with the DPOF (Digital Print Order Format) standard. In this file, a field bounded by an [image during communication] tag 501 indicates image information for one image file obtained in the communication capturing mode. The information file is configured by describing a plurality of pieces of these image information. Note that respective pieces of image information are described in ascending order of captured date and time. In each image information, a captured date and time 502, camera name 503, storage path 504 of an image file, and the like are described. Note that each vendor can define identifiers such as an [image during communication] tag, "camera name", and "captured date and time" in FIG. 5 within the range compliant with the DPOF standard. However, since there is no file name compliant with the existing DPOF standard, it has to be defined separately.

Next, the microcomputer 201 checks if the information file already describes the image information (S308). If the image information is already described, the microcomputer 201 compares the captured date and time described in the information file and those of the received image file (S310). If the captured date and time of the received image file are the latest date and time, the microcomputer 201 adds that captured date and time to the information file intact (S309). If the captured date and time of the received image file are not the latest date and time, the microcomputer 201 describes the captured date and time of the received image file at a location according to the order of captured dates and times by searching the information file (S311).

Referring back to the description of FIG. 3, a case will be described below wherein it is determined in step S301a that camera B executes capturing. In this case, the microcomputer 201 of camera B stores a captured image file in the image storage unit 209 (S305). Furthermore, the microcomputer 201 of camera B transmits a capturing notification to camera A, and then transmits the captured image file to camera A (S306). Moreover, the microcomputer 201 of camera B transmits image information to camera A (S312). In addition, the microcomputer 201 of camera B adds information of the captured image file to the information file (S309).

The purpose of the processes in steps S308 to S311 will be explained below. For example, a case will be examined below wherein capturing is executed using camera B immediately after capturing is executed using camera A. In this case, the information file describes image information obtained by capturing by camera A and that obtained by capturing by camera B in this order, and this description order follows the true capturing order.

However, when transmission of the image file from camera A to camera B takes time, the image information obtained by capturing by camera B may be undesirably described earlier.

Hence, in this embodiment, by comparing pieces of attribute information of image files, the true capturing order is reflected to the information file.

[Handling of Image File Obtained during Communication Capturing Mode]

Transmission/reception of an image file in the communication capturing mode has been explained. As described above, in this embodiment, both the image information of an image captured by camera A and that of an image captured by camera B in the communication capturing mode are described in the single information file. Handling of an image file obtained in the communication capturing mode will be described below.

The following processes include those which can be executed not in the communication capturing mode.

Figure 6:
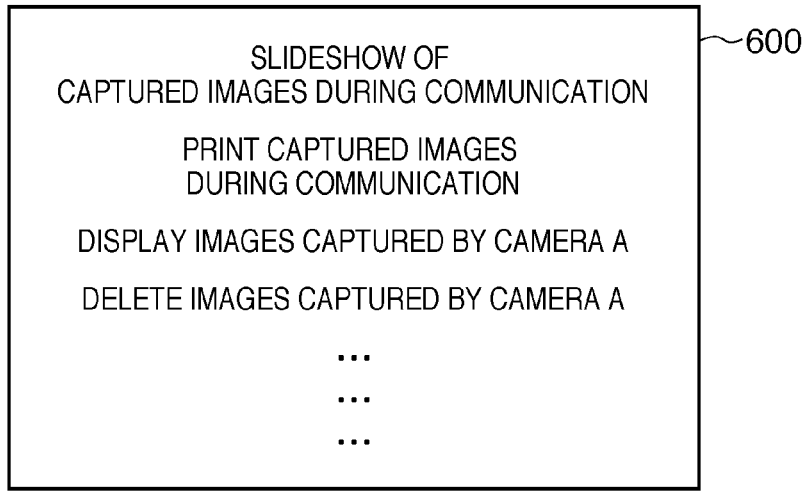
FIG. 6 is a view showing an example of a menu screen required to handle image files stored in a camera collectively.

When the user wants to print image files stored in the image storage unit 209 or reproduce these image files with a slideshow collectively, he or she operates the camera to display a menu screen 600 shown in FIG. 6 on the image display unit 208 and can operate it. The format of the menu screen displayed on the image display unit 208 is not limited to the example of FIG. 6. Note that the camera refers to the information file 500 according to a user's operation, and decides appropriate items as those to be displayed on the menu screen. For example, when the information file 500 does not include any image file captured by camera A, the camera does not display an item "delete images captured by camera A" on the menu screen 600 or grays it out to disable a user's selection.

For example, when the user selects an item "print captured images during communication" from the menu screen 600 in FIG. 6, the microcomputer 201 refers to the information file 500 in FIG. 5, and additionally writes required information in AUTPRINT.MRK as a printing setting file. As an example of the printing setting file, for example, a DPOF (Digital Print Order Format) file is available. FIG. 7 exemplifies an AUTPRINT.MRK file 700. The AUTPRINT.MRK file shown in FIG. 7 describes file paths obtained with reference to the information file 500. On the other hand, when the user selects an item "slideshow of captured images during communication", the microcomputer 201 describes required information in AUTPLAY.MRK as a reproducing setting file.

With this processing, the AUTPRINT.MRK or AUTPLAY.MRK file describes the file paths described in the information file, that is, those of image files obtained in the communication capturing mode as output targets collectively. Therefore, upon execution of printing or a slideshow using the AUTPRINT.MRK or AUTPLAY.MRK file, images captured by a plurality of cameras in the communication capturing mode can be printed collectively, or a slideshow of these images can be executed. For example, the camera which loads the AUTPRINT.MRK file reads out image files in turn in the description order in the information file, and transmits the readout image files to a printer, thus collectively printing these image files.

Figure 8:
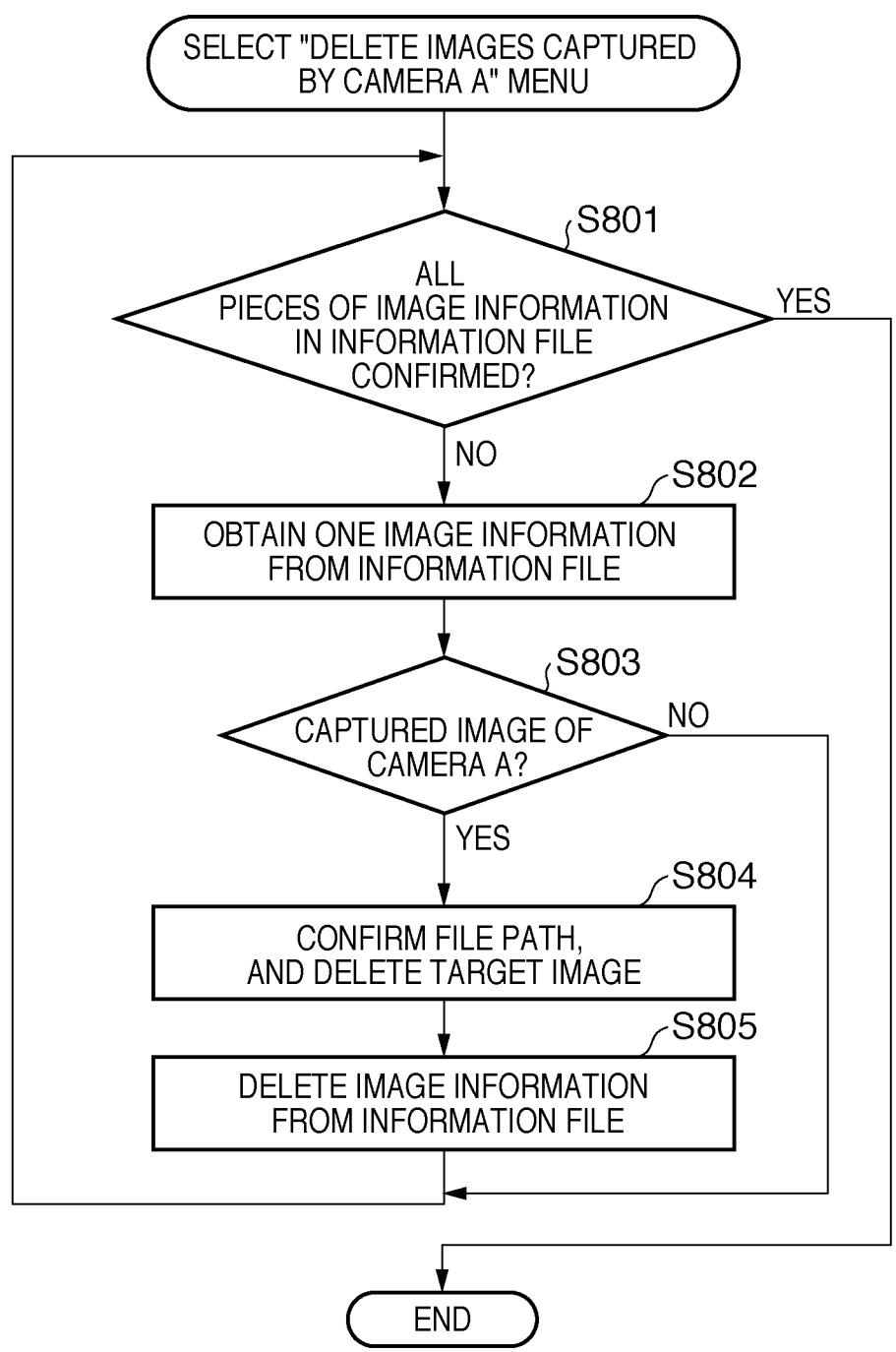
FIG. 8 is a flowchart showing processing for deleting an image file stored in the camera.

Processing executed when the user selects an item "delete images captured by camera A" on the menu screen 600 of camera B will be described below with reference to FIG. 8. Referring to FIG. 8, the microcomputer 201 of camera B obtains image information in the information file 500 one by one in the description order (S801, S802). The microcomputer 201 then checks if camera A is described in "camera name" (S803). If the image information describes camera A, the microcomputer 201 deletes a target image file from the image storage unit 209 with reference to a file path described in the information file 500 (S804). Furthermore, the microcomputer 201 deletes the image information itself from the information file 500 (S805). Note that a confirmation mode for the user may be provided. For example, a dialog that confirms the user as to whether or not to delete an image file may be displayed on the image display unit 208 or a thumbnail of that image file may be displayed prior to deletion of the image file.

Figure 9:
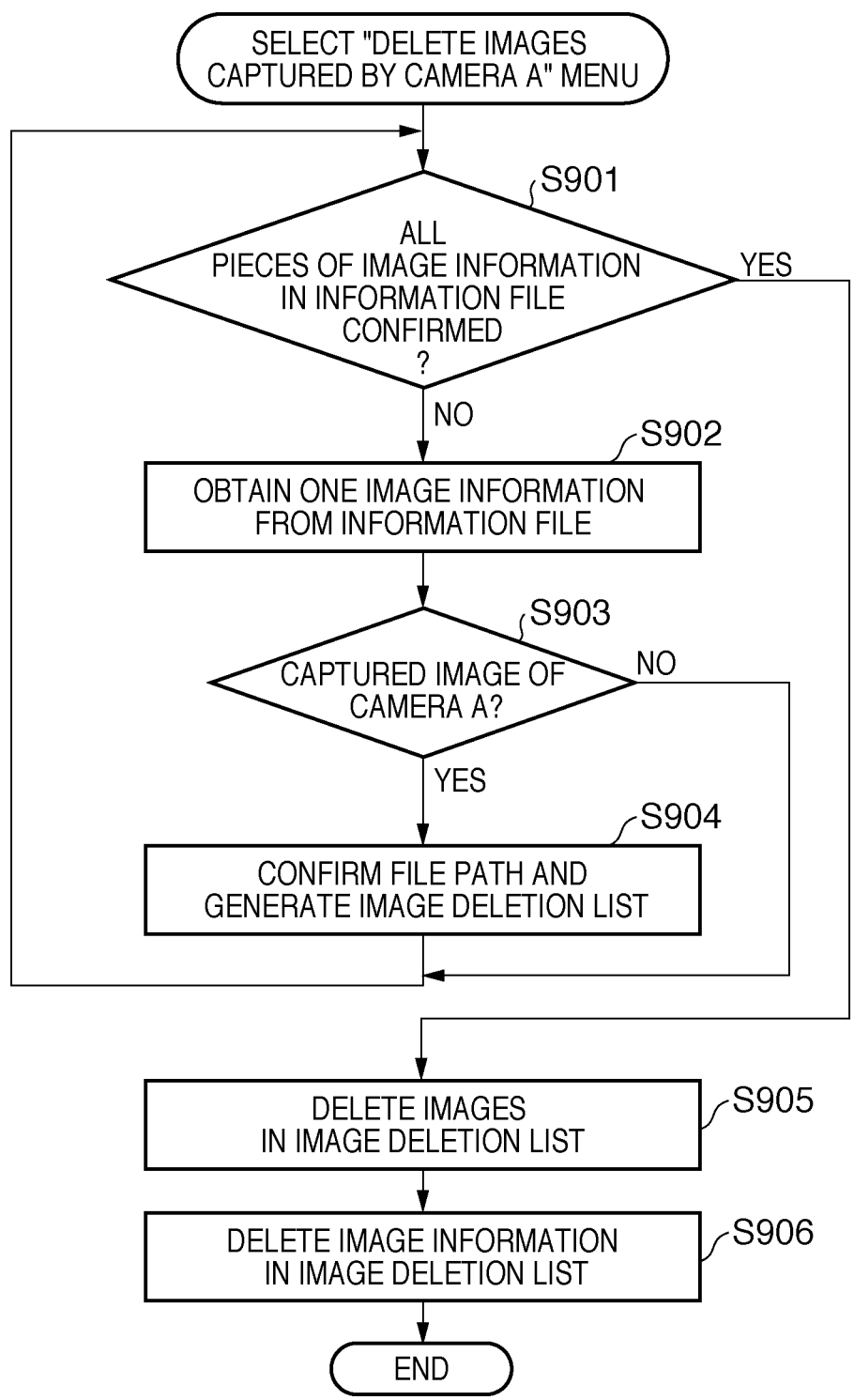
FIG. 9 is a flowchart showing processing for deleting image files stored in the camera collectively.

Upon deleting an image file in FIG. 8, image files may be deleted collectively in place of deleting them one by one. This processing will be described below with reference to FIG. 9. In steps S901 to S903 in FIG. 9, the same processes as in steps S801 to S803 in FIG. 8 are executed. Then, in step S904, the microcomputer 201 generates an image deletion list which describes the file paths and the like of image files captured by camera A.

After the microcomputer 201 executes the processes in steps S901 to S904 to all the pieces of image information described in the information file 500, it deletes the image files described in the image deletion list from the image storage unit 209 simultaneously (S905). Furthermore, the microcomputer 201 deletes the corresponding information to the deleted image files from the information file 500 (S906). Note that a confirmation mode for the user may be provided. For example, the image deletion list may be presented to the user to confirm him or her as to whether or not to delete image files again, or thumbnails of these image files may be displayed before deletion of the image files.

As described above, using the image information described in the information file 500, image files received from the camera during communication and those captured by the self-apparatus can be easily handled without requiring any troublesome operations. In this embodiment, information obtained from image files captured in the communication capturing mode is described but information obtained from image files captured in the normal capturing mode is not described in the information file 500.

<Second Embodiment>

The second embodiment will be described below. A camera according to this embodiment executes processing when it fails to receive an image file from a camera during communication, in addition to the processing in the first embodiment. Since this embodiment includes many parts common to the first embodiment, a description of the common parts will not be repeated, and parts unique to this embodiment will be mainly explained.

Figure 10:
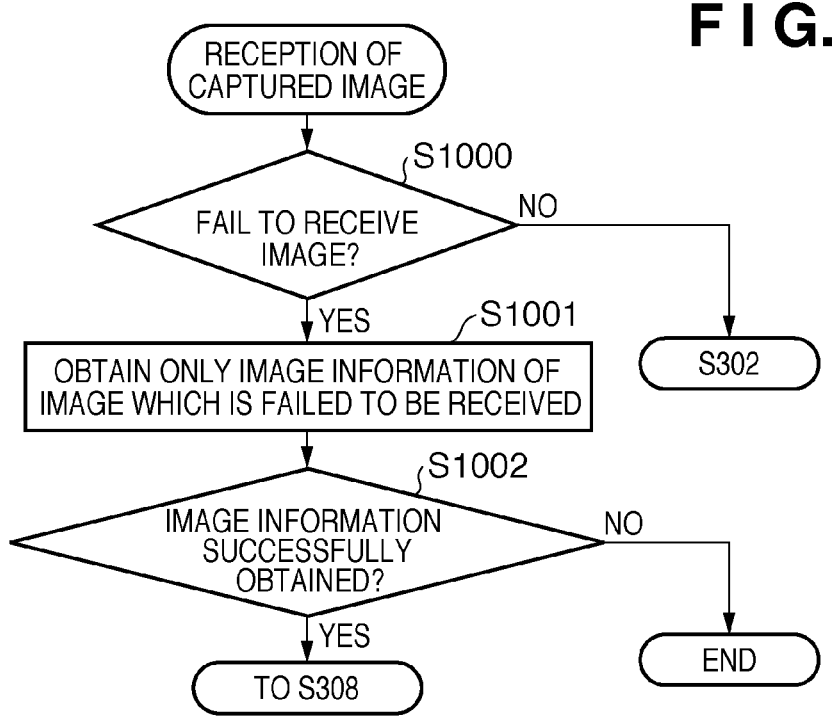
FIG. 10 is a flowchart showing processing executed when the camera fails to receive an image file from a camera during communication.

Processing executed by camera B when camera B fails to receive an image file from camera A will be described below with reference to FIG. 10. Referring to FIG. 10, when camera B fails to receive an image file from a camera during communication (S1000), the microcomputer 201 obtains image information of the image file, which is failed to be received, from camera A (S1001). If the microcomputer 201 can successfully receive the image information in step S1001, it executes the processing described in step S308 in FIG. 3. If the microcomputer 201 fails to receive even the image information, it displays a message indicating an obtaining failure of the image file on the image display unit 208, and aborts the processing. Note that an error message or the like may be displayed to allow the user to confirm abort of the image obtaining processing.

Figure 11:
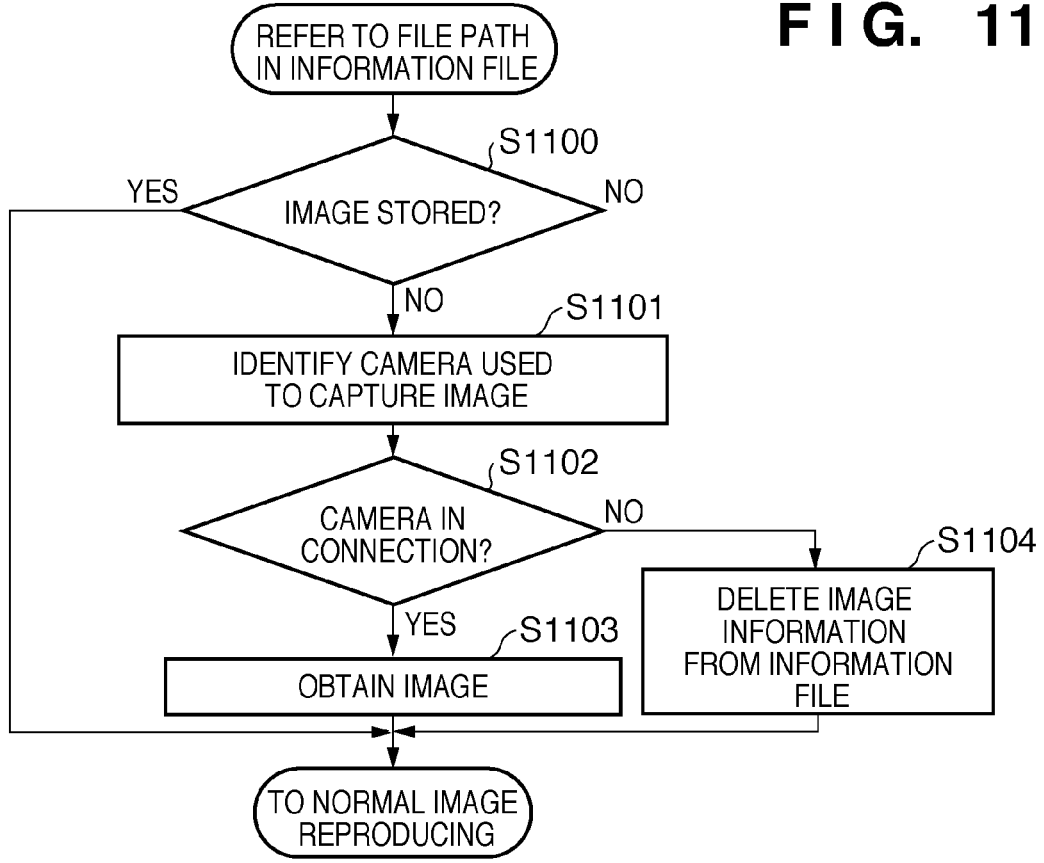
FIG. 11 is a flowchart showing processing executed when an image file described in an information file is not available in image reproducing.

When the microcomputer 201 can successfully obtain the image information in step S1001, an image itself may not be stored in the image storage unit 209 although the information file 500 includes its image information at the time of reproducing an image. Processing in this case will be described below with reference to FIG. 11. Referring to FIG. 11, the microcomputer 201 checks if an image file exists at the location of a file path described in the information file 500 in the image storage unit 209 (S1100). If no image file exists, the microcomputer 201 identifies a camera which captured that image from the camera name included in the image information (S1101). In the current example, camera A is identified. Then, the microcomputer 201 checks using the communication processor 206 if the self-apparatus is currently during communication with the identified camera (S1102). If the self-apparatus is during communication with the identified camera, the microcomputer 201 obtains an image file from that camera (S1103), and executes normal image reproducing. On the other hand, if the self-apparatus is not during communication with the identified camera (S1102), the microcomputer 201 deletes the image information from the information file 500 (S1104), and executes normal image reproducing.

Note that the processing in FIG. 11 is executed at the time of execution of printing or a slideshow, but it need not always be executed at that timing. For example, this processing may be executed at the end timing of the processing shown in FIG. 3.

As described above, this embodiment executes processing in consideration of a trouble in network connection. Then, an image file which is failed to be received is more likely to be obtained again and to be, for example, printed.

[Other Embodiments]

In the aforementioned embodiments, image files obtained in the communication capturing mode are described in the information file. By contrast, image files obtained in the communication capturing mode may be stored in a folder different from that in, for example, the normal capturing mode. For example, camera B prepares a "COMMUNICATION1" folder in addition to the "100CANOC" folder shown in FIG. 4. In the normal capturing mode, image files captured by camera B are stored in the "100CANOC" folder. In the communication capturing mode, image files captured by camera B and those received from camera A are stored in the "COMMUNICATION1" folder. Alternatively, image files obtained in the communication capturing mode may be stored in both the "100CANOC" folder and "COMMUNICATION1" folder. Note that storage in the "COMMUNICATION1" folder is continued until the communication capturing mode is canceled. After the communication capturing mode is canceled, when a new communication capturing mode is started, camera B creates a new folder "COMMUNICATION2", and stores image files in this folder. In this manner, camera B manages image files obtained in the communication capturing mode, and can execute a slideshow or printing only for image files stored in, for example, the "COMMUNICATION1" folder.

Furthermore, an index indicating capturing in the communication capturing mode may be added to an image file obtained in the communication capturing mode. For example, camera B issues an ID (for example, "COMMUNICATION1") in response to start of the communication capturing mode. Then, camera B adds the issued ID to image files as attribute information of image files captured by camera B and those received from camera A in the communication capturing mode. Addition of the ID is continued until the communication capturing mode is canceled. After the communication capturing mode is canceled, when a new communication capturing mode is started, camera B issues a new ID (for example, "COMMUNICATION2"). With this processing, a common ID is added to a plurality of image files captured during one communication capturing mode. In this manner, camera B manages image files obtained in the communication capturing mode, and can execute a slideshow or printing for image files added with an arbitrary ID.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-008239, filed Jan. 16, 2009, and 2009-290868, filed Dec. 22, 2009, which are hereby incorporated by reference herein in their entirety.

What is claimed is:

1. An image capturing apparatus which communicates with another image capturing apparatus, the image capturing apparatus comprising:
   an image capturing unit configured to obtain image data by capturing an image of an object;
   a reception unit configured to receive image data captured by the another image capturing apparatus during communication with the another image capturing apparatus;
   a storage unit configured to store the image data received by said reception unit in a storage medium; and
   a processor configured to describe image information of the image data received by said reception unit in an information file which describes image information used to identify image data stored in said storage unit,
   wherein the information file is a single information file in which is described image information of each of a plurality of image data,
   wherein the image capturing apparatus has a communication capturing mode for communicating with the another image capturing apparatus, and for allowing to execute both (a) capturing by said image capturing unit and (b) reception of image data captured by the another image capturing apparatus,
   wherein when said image capturing unit executes capturing during communication with the another image capturing apparatus, said processor describes, in the information file, (a) image information of the image data obtained by the capturing and (b) image information of the image data received in the communication capturing mode, and said processor describes, in the information file in an order of captured dates and times, a file path where the image data is stored, and
   wherein the information file is used for an output control of the image data described in the information file.

2. The apparatus according to claim 1, wherein the image information includes captured date and time of image data stored in the storage medium, and
   wherein said processor describes the image information in the information file based on the captured date and time included in the image information.

3. The apparatus according to claim 1, wherein the image information includes an apparatus name of an apparatus which captured image data stored in said storage unit.

4. The apparatus according to claim 1, wherein the image information is referred to when at least one of printing, reproducing, and deleting of image data is executed.

5. The apparatus according to claim 1, wherein said processor renames a file name of the image data received by said reception unit according to file names of image data already stored in the storage medium, and stores image data with the renamed file name in said storage unit.

6. The apparatus according to claim 1, wherein when said image capturing apparatus fails to receive image data from the another image capturing apparatus during communication with the another image capturing apparatus, said reception unit receives image information of the image data from the another image capturing apparatus, and then said processor checks if the another image capturing apparatus described in the image information is connected when image data received from the another image capturing apparatus does not exist, and said processor receives the image data which is failed to be received from the another image capturing apparatus when the another image capturing apparatus is connected, and executes deleting of the image information received from the another image capturing apparatus when the another image capturing apparatus is not connected.

7. The apparatus according to claim 1, wherein a storage location of at least one image data is identified by a predetermined tag described in the information file.

8. The apparatus according to claim 1, wherein the information file is a Digital Print Order Format file,
   wherein said processor describes, in the Digital Print Order Format file, image information of the image data received by said reception unit by storing, in the Digital Print Order Format file, (a) tagged data identifying the another image capturing apparatus, and (b) data identifying a file path of the image data, and wherein when the Digital Print Order Format file contains image information of a plurality of image data, the image information is stored in ascending order of captured date and time.

9. A method of controlling an image capturing apparatus which has an image capturing unit configured to capture an object and obtain image data and communicates with another image capturing apparatus, the method comprising the steps of:

receiving image data captured by the another image capturing apparatus during communication with the another image capturing apparatus;

storing the image data received in the receiving step in a storage medium; and describing image information of the image data received in the receiving step in an information file which describes image information used to identify image data stored in the storage medium, wherein the information file is a single information file in which is described image information of each of a plurality of image data, wherein the image capturing apparatus has a communication capturing mode for communicating with the another image capturing apparatus, and for allowing to execute both (a) capturing by the image capturing unit and (b) reception of image data captured by the another image capturing apparatus, wherein, when the image capturing unit executes capturing during communication with the another image capturing apparatus, (a) image information of the image data obtained by the capturing and (b) image information of the image data received in the communication capturing mode are described in the information file in the describing step, and a file path where the image data is stored is described in the describing step in the information file in an order of captured dates and times, and wherein the information file is used for an output control of the image data described in the information file.

10. A non-transitory computer-readable storage medium storing a program for causing a computer to execute a control method according to claim 9.

* * * * *